June 21, 1966  W. D. NUTTEN ETAL  3,256,869
FUEL FEED SYSTEM FOR INTERNAL COMBUSTION ENGINES
Filed June 27, 1963  3 Sheets-Sheet 1
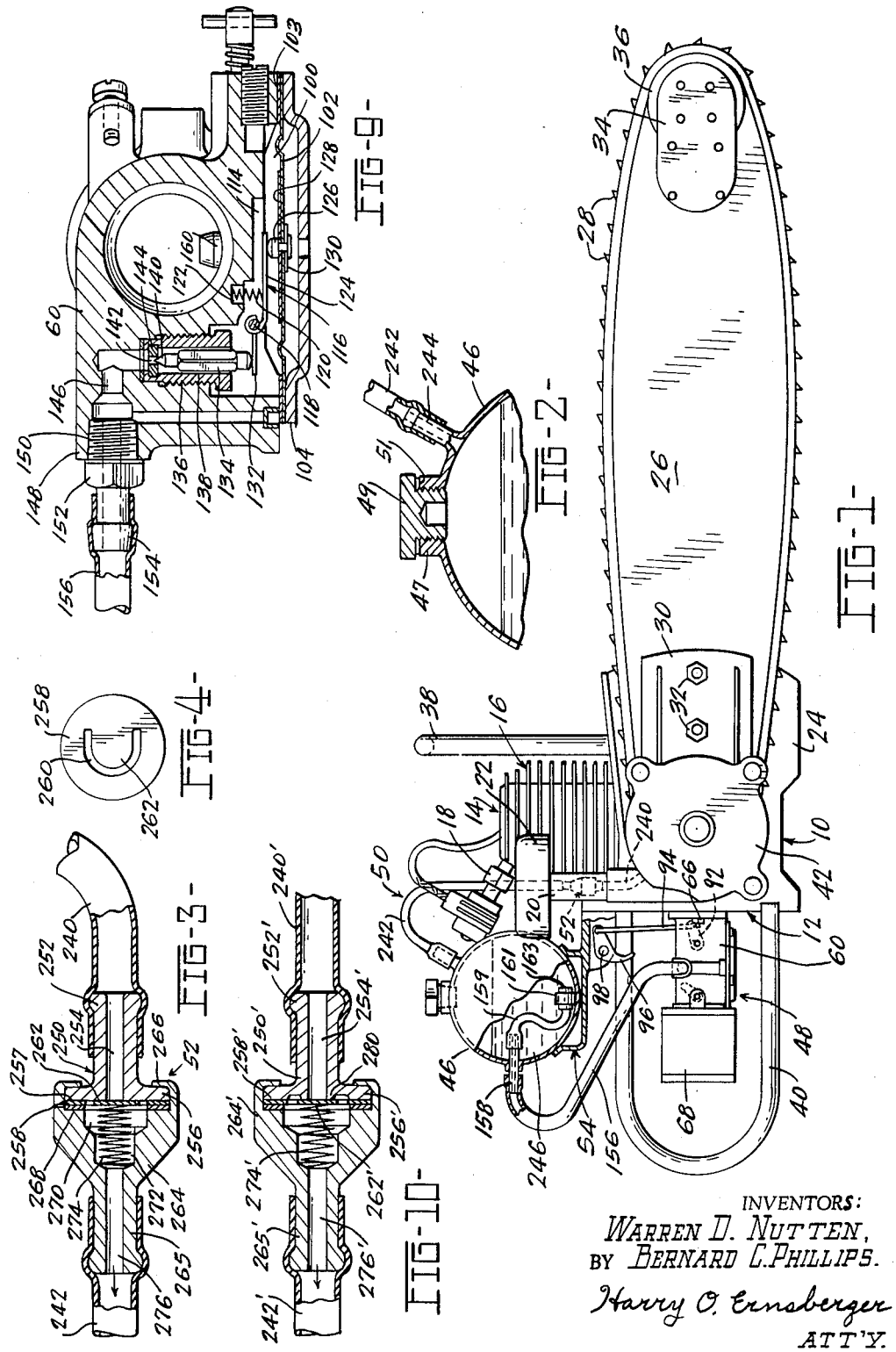
INVENTORS:
WARREN D. NUTTEN,
BY BERNARD C. PHILLIPS.
Harry O. Ernsberger
ATT'Y.

June 21, 1966     W. D. NUTTEN ETAL     3,256,869
FUEL FEED SYSTEM FOR INTERNAL COMBUSTION ENGINES
Filed June 27, 1963     3 Sheets-Sheet 2
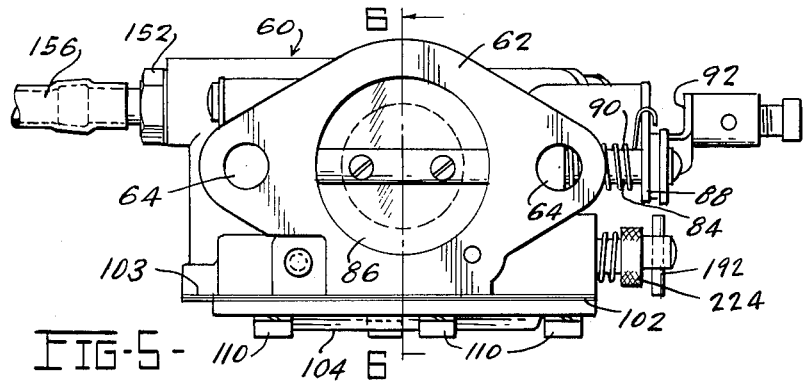
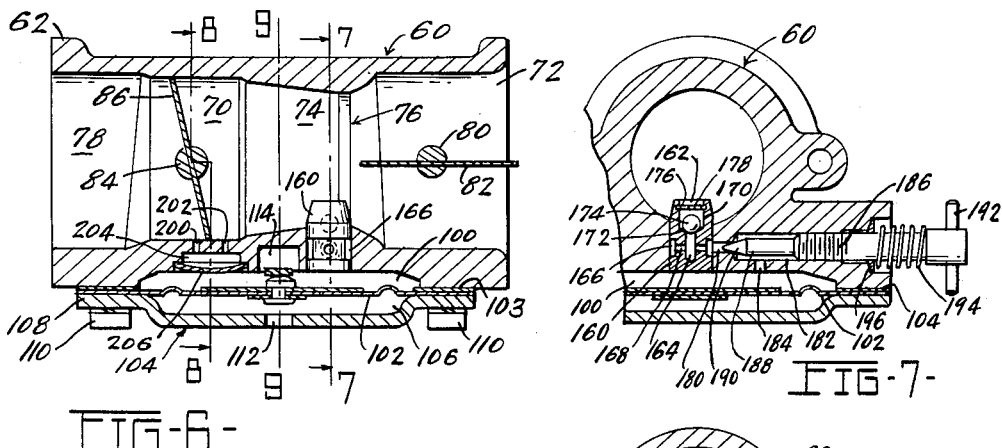
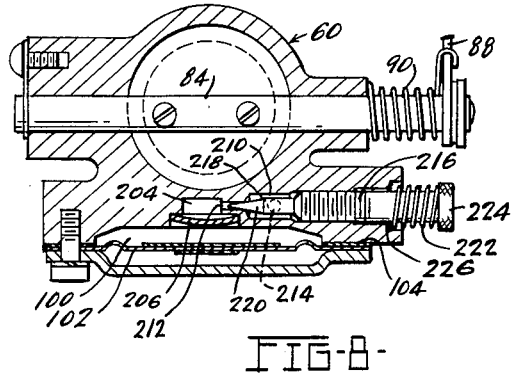
INVENTORS:
WARREN D. NUTTEN,
BY BERNARD C. PHILLIPS.
Harry O. Ernsberger
ATT'Y.

June 21, 1966 W. D. NUTTEN ET AL 3,256,869
FUEL FEED SYSTEM FOR INTERNAL COMBUSTION ENGINES
Filed June 27, 1963 3 Sheets-Sheet 3
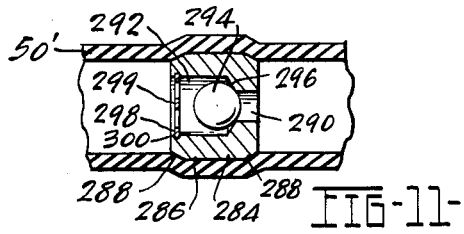
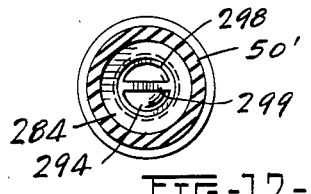
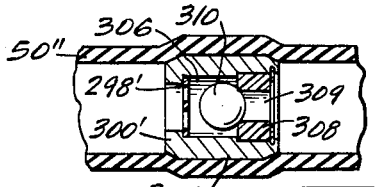
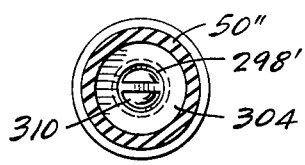
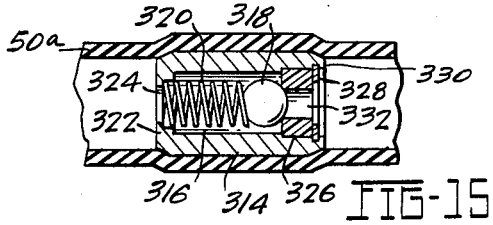
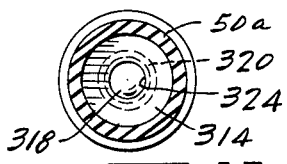
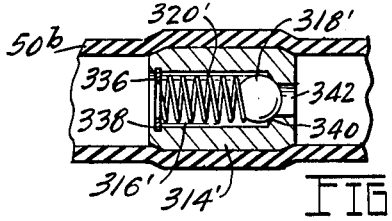
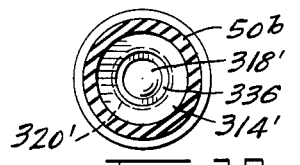
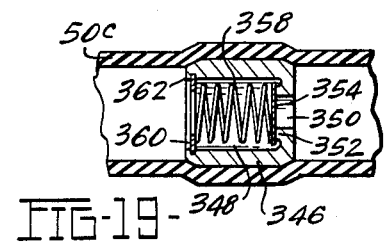 
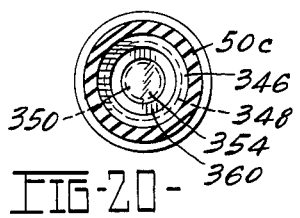
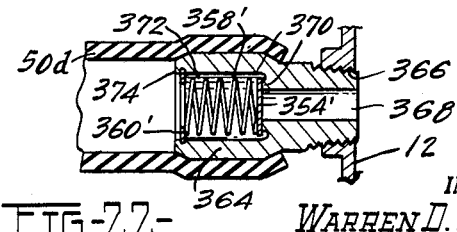
INVENTORS:
WARREN D. NUTTEN,
BY BERNARD. C. PHILLIPS.
Harry O. Ernsberger
ATT'Y.

United States Patent Office 3,256,869
Patented June 21, 1966

3,256,869
FUEL FEED SYSTEM FOR INTERNAL
COMBUSTION ENGINES
Warren D. Nutten, Erie, Mich., and Bernard C. Phillips, Toledo, Ohio, assignors to The Tillotson Manufacturing Company, Toledo, Ohio, a corporation of Ohio
Filed June 27, 1963, Ser. No. 291,136
14 Claims. (Cl. 123—73)

This invention relates to a fuel feed system for an internal combustion engine and more especially to a fuel feed system for use with engines of the two cycle type especially adapted for operating chain saws or other instrumentalities where the engine and fuel feed arrangement are required to function in various angular positions and in inverted position.

Chain saws have been used extensively for felling trees particularly in forests in sparsely populated regions where there is little or no fire protection. A major hazard in the use of a chain saw, adapted to operate in all positions including inverted position, is that heretofore the fuel supply tank has been vented, and when the saw unit is in an inverted position, fuel escapes through the vent means. As the fuel tank is normally under substantially atmospheric pressure, a fuel pump associated with the engine or the carburetor has been utilized to pump the fuel from the fuel tank to the carburetor.

The fuel supply tank or receptacle is usually attached to the chain saw unit and is provided with inlet and outlet vents which, under certain conditions of operation or position, permit leakage of fuel from the tank. Chain saws are usually powered by two cycle engines because of the adaptability of such engines to operate in all positions. As float controlled carburetors will not function in extreme positions of tilt or in inverted position, diaphragm carburetors are used extensively for supplying the fuel and air mixture to two cycle engines for chain saw use in conjunction with a fuel pump so that fuel is delivered from the fuel tank to the carburetor irrespective of the relative positions of these components.

The present invention embraces a method or system utilizing fluid pressures developed in the engine crankcase during engine operation as a media for establishing pressure in a fuel tank in a manner to effect delivery of fuel to the charge forming apparatus or carburetor eliminating the use of a separate fuel pump for delivering fuel to a carburetor.

An object of the invention is the provision of a system or method utilizing an unvented fuel tank in conjunction with pressurization of the tank enabling the use of the engine and carburetor and fuel tank in any position without loss or escape of fuel from the tank or system.

Another object is the provision of a fuel tank pressurizing system enabling the successful operation of the engine in all positions at high speeds under all load conditions regardless of whether the pressure line connection at the fuel tank is submerged and under greater pressure than that developed in the engine crankcase or pressurizing source.

Another object of the invention is the provision of a fuel feed system particularly for use with a two cycle engine, which is operable in all positions, wherein the fuel tank is pressurized through the medium of fluid pressure developed in the crankcase of the engine through the use of a check valve or one-way valve in a pressurizing line or tube connected with the fuel tank which is capable of opening and closing at very high speeds or high frequencies of upwards of ten thousand pressure impulses per minute or more and which is effective to prevent fuel blow-back from the fuel tank to the crankcase through the pressurizing line or tube.

Another object of the invention is the provision of a valve means or unit embodying a low inertia pressurizing valve associated with a pressure transmitting tube or line between the crankcase of a two cycle engine and a fuel tank which is substantially unaffected by high frequency vibrations of the engine encountered in the use of a portable chain saw unit.

Another object of the invention is the provision of a fuel feed system utilizing a pressurized fuel supply in combination with a diaphragm type carburetor embodying a fuel inlet mechanism arranged to withstand substantial pressures developed in the fuel tank without leakage of fuel into the carburetor during operation whereby fuel is delivered from the supply to the carburetor under the influence of aspiration in the mixing passage of the carburetor controlling the fuel inlet valve mechanism to satisfy the engine requirements.

Another object of the invention is the provision of a pressurized fuel supply for a carburetor particularly for use with a two cycle engine wherein the need for vent means is eliminated thereby eliminating the liability of fuel leakage from the system thus reducing fire hazard.

Another object of the invention is the provision of a closed or unvented fuel feed system embodying a diaphragm type carburetor for a chain saw engine of the two cycle type wherein the fuel inlet valve of the carburetor is normally biased toward closed position under sufficient force to prevent opening of the fuel inlet valve except as the same is influenced by aspiration in the mixing passage acting upon a diaphragm in the carburetor to deliver the required amount of fuel into the mixing passage for engine operation and without impairing the normal operation of the diaphragm in its function of metering fuel flow in accordance with the engine requirements.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a chain saw of conventional construction and a fuel feed system of the invention associated therewith;

FIGURE 2 is a fragmentary sectional view of a portion of a fuel supply tank illustrating a pressurizing tube or line connected therewith;

FIGURE 3 is a longitudinal sectional view illustrating a form of valve means incorporated in the pressurizing tube connected with the crankcase of the engine illustrated in FIGURE 1;

FIGURE 4 is a plan view of the valve means shown in FIGURE 3;

FIGURE 5 is an end view of a diaphragm type carburetor or charge forming apparatus forming a component of the fuel feed system;

FIGURE 6 is a longitudinal sectional view taken substantially on the line 6—6 of FIGURE 5;

FIGURE 7 is a transverse sectional view taken substantially on the line 7—7 of FIGURE 6;

FIGURE 8 is a transverse sectional view taken substantially on the line 8—8 of FIGURE 6;

FIGURE 9 is a transverse sectional view taken substantially on the line 9—9 of FIGURE 6;

FIGURE 10 is a view similar to FIGURE 3 illustrating a modified form of valve construction for use with the pressurizing line;

FIGURE 11 is a sectional view illustrating a modified form of valve means for use with the fuel tank pressurizing tube;

FIGURE 12 is an end view of the construction shown in FIGURE 11;

FIGURE 13 is a sectional view similar to FIGURE 11 illustrating a modified form of valve seat construction;

FIGURE 14 is an end view of the construction shown in FIGURE 13;

FIGURE 15 is a sectional view illustrating another form of valve construction for use with the fuel tank pressurizing tube;

FIGURE 16 is an end view of the construction shown in FIGURE 15;

FIGURE 17 is a sectional view illustrating a modified form of valve construction for use with a fuel tank pressurizing tube;

FIGURE 18 is an end view of the construction shown in FIGURE 17;

FIGURE 19 is a sectional view illustrating another form of valve construction for use with the fuel tank pressurizing tube;

FIGURE 20 is an end view of the construction shown in FIGURE 19;

FIGURE 21 is a detail view of the valve member illustrated in FIGURE 19, and

FIGURE 22 illustrates a form of valve construction wherein the valve cage may be directly supported in an opening in the wall of the engine crankcase.

While the fuel feed system and valve arrangement of the invention are particularly usable with chain saw engines of the two cycle type, it is to be understood that the pressurized fuel feed system may be used with engines for powering other instrumentalities such as portable tools, marine engines or other engines wherein a fluid pressure source is available for pressurizing the fuel feed system.

Referring to the drawings in detail and initially to FIGURE 1, there is illustrated a chain saw of conventional construction powered by an engine of the two cycle type. The chain saw is inclusive of a frame 10 which, in the embodiment illustrated, is integral with a crankcase 12 supporting a cylinder 14 of the air cooled type, the cylinder being equipped with heat radiating fins 16. The engine is equipped with a conventional crankshaft, piston and connecting rod (not shown) and a spark plug 18 is provided in the cylinder head for igniting the combustible mixture in the cylinder 14 of the engine.

The exhaust pipe 20 of the engine is provided with a sound attenuating device or muffler 22 of conventional construction. The frame 10 is provided with a forwardly extending plate or member 24 to which is secured a plate-like chain saw guide 26 for an endless or chain type saw construction 28. The saw guiding and supporting plate 26 is secured to the frame extension 24 by a clamping plate 30 and bolts 32.

The forward end of the saw guide plate 26 is provided with a housing construction 34 within which is journally supported a rotatable guide sprocket 36 which is engaged with the chain saw construction 28.

The frame 10 is equipped with an upwardly extending hand grip portion 38 and a rearwardly extending hand grip portion 40 to facilitate handling or manipulation of the saw construction. Secured to one side of the engine crankcase 12 is a housing 42 enclosing a centrifugally-actuated clutch of conventional construction for establishing a drive connection between the engine crankshaft and a saw driving sprocket (not shown).

In the operation of the chain saw construction at idling speed of the engine, the clutch mechanism within the housing 42 effects a disengagement of the saw driving sprocket from the engine. Upon increased engine speed, the centrifugal clutch within the housing 42 automatically establishes a drive connection between the engine and crankshaft and the saw driving sprocket to actuate or drive the saw 28.

The fuel feed system of the invention is inclusive of a fuel tank or receptacle 46, a diaphragm-type carburetor or charge forming device 48, a pressurizing line or tubular means 50 connecting the engine crankcase with the fuel supply tank 46 and a valve means or valve unit 52 in the pressurizing line. The fuel tank or supply tank 46 is preferably of cylindrical shape and is supported upon a bracket 54 secured to the engine crankcase or frame.

The carburetor 48 is inclusive of a body 60 equipped at its forward end with a mounting flange 62 provided with openings 64 to accommodate securing bolts 66 for securing the carburetor body to the crankcase of the engine. As shown in FIGURE 1, the inlet end of the carburetor body 60 is equipped with an air filter 68 of conventional construction for filtering out foreign particles so that clean air is admitted to the mixing passage of the carburetor.

The diaphragm carburetor construction is illustrated in detail in FIGURES 5 through 9. The carburetor body 60 is formed with a longitudinally disposed mixing passage 70 having an air inlet region 72, a Venturi 74 having a choke band or restricted region 76, and a mixture outlet 78. Journaled in bores formed in the wall of the body 10 at the inlet region 72 is a shaft 80 supporting a choke valve 82 of the disc type which is movable to closed position for starting the engine. The wall defining the mixture outlet region 78 is formed with bores in which is journaled a shaft 84, the shaft supporting a disc type throttle valve 86 of conventional construction.

The throttle valve shaft 84 is equipped with a manipulating arm 88, and a coil spring 90 associated with the shaft 84 is engageable with the arm 88 for biasing the throttle valve toward near closed position, as shown in FIGURE 6. The throttle shaft 84 is equipped with a manipulating arm 92 which, as shown in FIGURE 1, is connected by means of a link or rod 94 with a trigger or throttle operating member 96 pivoted on a pin 98 carried by a depending portion of the bracket 54. By manipulating the trigger or member 96 the throttle shaft 84 may be rotated to open and close the throttle valve 86.

The carburetor body 60 is formed with a generally circular recess providing a fuel chamber 100, and a flexible membrane or diaphragm 102 extends across the recess forming a flexible wall of the chamber 100, as particularly shown in FIGURES 6 through 9. An annular gasket 103 is disposed between a flat surface of the carburetor body 110 surrounding the recess 100 and the diaphragm 102 to effect a seal between the diaphragm and the carburetor body. A substantially circular closure member or cover 104 is disposed beneath the diaphragm 102 and is shaped with a central depressed portion providing a space to accommodate flexing movements of the diaphragm 102.

An annular peripheral region or flange 108 of the member 104 is engaged with the peripheral region of the diaphragm 102 and maintains the diaphragm in assembled relation with the carburetor body. A plurality of securing screws 110, extending through aligned openings in the flange 108 of the cover member, the diaphragm and the gasket, are threaded into openings formed in the carburetor body 60 to secure these components in assembled relation. The cover member 104 is provided with a vent opening 112 to establish atmospheric pressure in the space 106 at the dry side of the diaphragm 102.

The diaphragm 102 is made of highly flexible material and may be fashioned as an impervious resin film or the same may be a fine mesh fabric coated with a suitable material to render the diaphragm impervious.

Disposed within a recess 114 in the body 60 and opening into the chamber 100 is a lever 116 pivoted or fulcrumed intermediate its ends on a pin or fulcrum member 118 mounted in an opening formed in the body 60. Positioned as close as practicable to the fulcrum pin 118 is an expansive coil spring 120, one end being bottomed in a recess 122 in the body and the other end engaging the long arm 124 of the lever 116 as shown in FIGURE 9. The diaphragm 102 is equipped with a member 126 the head of which is adapted for engagement with the distal end of the long arm 124 of the lever 116. The member 126 may be in the form of a rivet and extends through openings in reinforcing discs 128 and 130 disposed at opposite sides of the diaphragm, the member 126 being riveted to secure the member to the reinforcing discs for movement with the diaphragm. The lever 116 is fashioned with a short arm 132 which engages one end of a fuel inlet valve member 134.

As shown in FIGURE 9, the carburetor body 60 is provided with a threaded bore which accommodates a threaded fitting 136 of sleeve-like configuration having an interior bore 138 in which a valve body or member 134 is disposed for slidable movement. The valve body 134 is of polygonal cross-section, as for example, square cross-section to facilitate fuel flow past the valve body. The sleeve-like member or fitting 136 forms a valve cage for the valve member or body 134. The opposite end of the valve body 134 is provided with a valve portion 140 of cone or needle-shape which extends into and cooperates with a port 142 provided by an annularly shaped valve seat 144.

The port 142 is in communication with a fuel inlet channel 146 formed in the body 60. A boss portion 148 of the body 60 adjacent the fuel inlet 146 has a threaded bore accommodating the threaded portion 150 of a fitting 152, the fitting being equipped with a nipple portion 154 over which is telescoped an end region of a fuel line or fuel conveying tube 156. As shown in FIGURE 1, the fuel conveying tube 156 is connected with a spud or tubular fitting 158 disposed in an opening in a wall of the fuel tank 46 and welded or otherwise sealed in the wall of the tank.

From examination of FIGURE 9 it will be noted that upward movement of the diaphragm 102 causes counter-clockwise movement of the lever 116 permitting the valve member 134 to move downwardly to facilitate fuel flow through the port 142 past the valve 140 and into the fuel chamber 100. The diaphragm 102 is actuated solely by aspiration in the mixing passage 70 as the fuel chamber 100 is unvented.

The carburetor is fashioned with a main orifice system and a secondary orifice system for delivering fuel into the mixing passage by aspiration or reduced pressure in the mixing passage established through the connection of the mixing passage with the crankcase of the engine. The main orifice or primary fuel delivery system includes a cylindrically-shaped fitting 160 provided with an outlet or orifice 162 opening into the mixing passage adjacent the restricted region or choke band 76 of the Venturi 74. The fitting 160 is fitted into a bore formed in the body 60, as shown in FIGURE 7.

The fitting 160 is formed with a central bore or channel 164 in communication with an annular recess 166 formed in the fitting by transversely disposed passages 168. The fitting is formed with a counterbore 170 and its juncture with the passage or bore 164 forms a ledge 172 providing a valve seat for a check valve means or a ball valve 174 which is loosely contained in the counterbore 170. Disposed in the upper end of the counterbore 170 at the region of the orifice or outlet 162 is an annular member 176 provided with a diametrically-arranged bar portion 178 providing a retainer to prevent dislodgment of the check ball 174.

Fuel is supplied to the passages in the fitting 160 through a restricted passage 180 in communication with a bore 182, the latter being in communication with the fuel chamber 100 through a fuel duct or passage 184. A portion of the bore 182 is threaded to accommodate a threaded portion of a valve member 186, the valve member 186 having a tenon portion 188 terminating in a needle-shaped valve 190 which cooperates with the restricted passage 180 to meter or regulate fuel flow from the fuel chamber 100 through the passages in the fitting 160 for delivery through the main orifice 162.

The valve member 186 extends exteriorly of the carburetor body 60 and is provided with a finger grip portion 192 for adjusting the valve member. A coil spring 194 surrounds the valve body and engages a sealing ring 196, as shown in FIGURE 7. The coil spring 194 provides friction to retain the valve member in adjusted position and exerts pressure against the sealing ring.

The secondary fuel delivery system includes an engine idling orifice 200 and a low speed orifice 202 opening into the mixing passage, as illustrated in FIGURE 6, these orifices being in communication with a supplemental chamber 204, the lower end of which is closed by a Welch plug. As shown in FIGURE 8, a bore 210 formed in the body is in communication with the supplemental chamber 204 by means of a restricted passage 212. A channel 214, shown in FIGURE 8, connects the bore 182 with the bore 210.

As shown in FIGURE 8, the carburetor body 60 is bored and threaded to receive the threaded portion of a valve body 216 having a tenon 218 terminating in a needle or cone-shaped valve portion 220 cooperating with the restricted passage 212 for regulating fuel flow to the secondary orifices 200 and 202. A coil spring 222 is disposed between a manipulating head 224 on the valve body 216 and a sealing ring 226 for holding the ring in sealing engagement with the valve body 216 and providing friction for maintaining the valve body 216 in adjusted position.

At intermediate or high engine speeds, with the throttle valve 86 in a substantially opened position, fuel is delivered by aspiration into the mixing passage 70 through the channels or bores 182 and 184 past the high speed metering needle or valve 190 through the restricted passage 180, the annular recess 166, passages 168, bore 164 in the fitting 160, past the check ball 174 through the outlet or orifice 176 where the fuel is mixed with air moving through the mixing passage to form a combustible mixture for delivery through the mixture outlet 78 into the engine crankcase.

When the throttle valve 86 is moved to engine idling or low speed position, fuel flows through channel 214, shown in FIGURE 8, to the supplemental chamber 204 thence through the orifice 200 or orifice 202 into the mixing passage. The fuel is delivered through orifice 200 when the throttle valve is in engine idling position and, when the throttle is opened slightly, additional fuel is delivered from the orifice 202 for low engine speed operation.

Whenever one or both of the orifices 200 and 202 are delivering fuel into the mixing passage, the check valve 174 in the fitting 160 engages the valve seat 172 under the influence of engine aspiration through the idling or low speed orifices and thereby prevents back bleeding of air from the mixing passage through the main orifice 162 into the fuel channels to prevent leaning of the fuel delivered to the secondary orifices. If back bleeding through the main orifice is not impeded by suitable means, such as the valve 174, air bleeding through the main nozzle into the fuel channels would cause the engine to stall.

In the embodiment of the valve arrangement associated with or incorporated in the fuel tank pressurizing line 50, a tube 240 is connected with the crankcase 12 of the engine and a second tube 242 connected with a hollow spud or nipple 244 welded or otherwise secured in an opening in the wall of the fuel tank 46, as shown in FIGURE 2.

Disposed between the adjacent ends of the tubes 240 and 242 forming the pressurizing line 50 is a valve unit 52, the function of which is to establish fluid flow or air flow from the crankcase by reason of the varying fluid pressures existent during engine operation in the crankcase into the fuel tank 46 in order to establish pressure upon the liquid fuel 246 in the tank.

One form of valve unit is shown in FIGURE 3 arranged to provide for the flow of air or fluid from the crankcase past the valve to establish or create pressure above atmospheric pressure in the fuel tank or receptacle 46. The valve unit 52 includes a member 250 having a nipple portion 252 onto which is telescoped an end of the tube 240 which is connected with the engine crankcase. The member 250 is provided with a central passage 254 and is formed with an enlarged disc-like portion 256. Disposed adjacent the planar face 257 of the disc portion 256 is a comparatively thin valve member or body 258 of flexible material such as synthetic rubber or plastic.

As shown particularly in FIGURE 4, the valve body 258 is formed with a U-shaped opening 260 provided by cutting away the material of the body to form a flap or tongue-like valve portion or valve 262. As shown in FIGURE 3, the flap valve or valve portion 262 normally seats on the planar surface 257 of the disc portion 256 and closes the end of the passage 254 adjacent the portion 256. A fitting 264 has a nipple portion 265 over which the end of the tube 242 is telescoped as shown in FIGURE 3.

The fitting 264 is provided with a bore to receive the circular valve body 258, the fitting being provided with a thin walled extension 266 which, in assembly, is swaged into engagement with the disc-like portion 256. Disposed adjacent the peripheral region of the circular valve body 258 is an annular gasket 268 to effect a seal between the fitting 264 and the valve member 258. The fitting 264 is fashioned with a counterbore 270 providing clearance space to accommodate movements of the valve portion or valve 262.

The fitting 264 is also formed with a bore 272 in which is disposed an expansive coil spring 274, an end of the spring engaging the valve or valve portion 262 for biasing the valve toward closed position. The nipple portion 265 of the fitting is provided with a passage 276 establishing communication with the tube 242.

Secured to an end portion of the nipple or coupling 158 interiorly of the fuel tank 46 is a tubular member 159 of flexible material, such as synthetic rubber or the like. Secured to the inlet end 163 of the tube 159 is a weight 161. The function of the weight 161 is to maintain the inlet end 163 of the fuel conveying tube 159 immersed in the liquid fuel in the tank 46 irrespective of the angular or inverted position of the fuel tank, as the weight 161 under the influence of gravity moves to the lowest region in the fuel tank assuring fuel supply to the carburetor 60. The fuel tank 46 is provided with a filler neck 47 interiorly threaded to receive a closure or cap 49, a gasket 51 being disposed between the cap and the filler neck 47 to seal the filler opening.

In the operation of the chain saw engine 14, the pressure impulses developed in the crankcase of the engine at each downward stroke of the piston, force air or fluid from the crankcase through the tube 240, passage 254, past the check valve 262, thence through the tube 242 into the fuel tank 46 to establish or create pressure above atmospheric pressure in the tank. Alternate periods of decreased pressure in the crankcase resulting from upward movements of the piston in the cylinder momentarily establish periods of decreased pressure in the tube 240, but the valve 262 is in closed position and thereby prevents reverse flow of air or fluid through the tubes 240 and 242.

The spring member 274 biases the valve or valve portion 262 toward closed position thus maintaining pressure in the fuel tank which is greater than atmospheric pressure. The developed pressure in the fuel tank is effective to convey fuel through the tube 156 to the inlet region of the carburetor so that during engine operation, liquid fuel under pressure is maintained at the region of the valve port 142 in the carburetor.

The spring 120 normally exerts sufficient pressure or force upon the lever 116 to maintain the inlet valve member 140 in closed position, the valve being opened by engine requirements as the aspiration in the mixing passage influences the metering diaphragm 102 to actuate the lever 116 and thereby effect opening of the valve 140 admitting fuel into the carburetor.

The spring 120, acting on the lever 116, is calibrated to maintain the inlet valve 140 is closed position against the pressure established in the fuel tank 46 by the pressure impulses transmitted through the pressurizing tubes 240 and 242 from the engine crankcase. Hence, delivery of fuel into the carburetor does not occur until the engine aspiration in the mixing passage moves the metering diaphragm 102 to admit fuel flow past the valve 140.

In this arrangement, the fuel supply to the charge forming device or carburetor 60 is under pressure at all times during engine operation so that fuel is conveyed to the carburetor without employing a fuel pump and that such fuel pressurizing system is effective to deliver fuel to the carburetor irrespective of the angular positions or inverted position of the engine and chain saw assembly. The fuel feed system is effectively sealed against leakage of fuel exteriorly of the engine and carburetor as the valve member 262 prevents flow of fuel from the fuel tank 46 through the pressurizing line 50 to the engine crankcase and the spring-biased inlet valve 140 prevents leakage of fuel into the carburetor.

The inlet valve seat 144 may be fashioned of resilient or deformable material such as synthetic rubber for cooperation with the cone-shaped valve portion 140, or the valve portion 140 may be made of resilient material for cooperation with a metal seat 144 to obtain a positive seal when the valve is closed.

Hence a pressurized fuel system is provided for the carburetor by a pressurized fuel tank through pressure developed in the crankcase by operation of the engine.

The spring 120, shown in FIGURE 9, biasing the valve 140 toward closed position exerts a force to maintain the valve 140 in closed position which is more than the maximum pressure developed in the fuel tank by the pressure impulses from the crankcase.

FIGURE 10 illustrates a modified form of check valve unit similar to that shown in FIGURE 3. In the arrangement shown in FIGURE 10, the disc-like portion 256' of the member 250' is provided with a circular ridge 280 at the entrance of the passage 254' to provide a raised circular area or seat engageable by the flap valve or valve portion 262' of the valve member 258' of the character shown in FIGURE 4. The tube 240' is telescoped over the nipple portion 252' and the tube 242' is telescoped over the nipple portion 265' of the fitting 264'. The spring 274' biases the flap valve 262' toward closed position.

The circular ridge 280 providing the valve seat functions to increase the unit pressure on the valve member 262' thereby deforming the yieldable material of the valve 262' to effectively seat the valve preventing reverse flow of fluid from the left side of the valve, as viewed in FIGURE 10, to the engine side of the valve upon reduced pressure cycles occurring in the crankcase of the engine between successive pressure pulsations. The operation of the system with the valve unit shown in FIGURE 10 is the same as with the valve unit shown in FIGURE 3.

FIGURES 11 and 12 illustrate a modified form of valve construction associated with a pressurizing line or tubular means 50' connecting the engine crankcase or other source of varying fluid pressure with the fuel supply tank 46. In this form, there is disposed within the single tube or pressurizing line 50' a valve cage, valve housing or fitting 284 of cylindrical shape preferably fashioned of brass or non-ferrous material. The line or tube 50' is of yieldable or flexible material and the fitting 284 is configurated with a cylindrical exterior surface 286 of slightly larger diameter than the inner diameter or hollow interior of the tube 50′ so as to be frictionally held in a predetermined position within the tube 50′.

The peripheral end regions of the fitting may be chamfered as at 288 to facilitate insertion of the fitting or valve cage 284 in the tube 50′. The valve cage 284 is provided with a passage or duct 290 in communication with a counterbore 292 in which is disposed a valve means in the form of a ball 294 adapted to seat against the ledge 296 formed at the juncture of the passage 290 with the counterbore 292. The ball valve 294 is loosely disposed in the chamber provided by the counterbore 292, and a member 298 of annular shape having a diametrically disposed bar portion 299 prevents dislodgment of the ball from the counterbore 292.

The ball valve retaining member 298 is secured to the fitting by swaging a portion of the fitting as indicated at 300 over the periphery of the retainer 298. The right-hand end of the tube 50′, as viewed in FIGURE 11, is in communication with the engine crankcase and the terminus of the tube 50′ at the left-hand of the fitting 284 is connected with the nipple or spud 244 in a wall of the fuel supply tank 46, shown in FIGURE 2. Pressure pulsations from the engine crankcase force air or fluid from the crankcase through the passage 290 past the ball valve 294 and establish pressure above atmospheric pressure in the region of the tube 50 to the left of the fitting 284 and in the fuel tank 46.

As the operation of the piston of the engine sets up alternate periods of reduced pressure in the crankcase, the ball valve 294, during such reduced pressure periods, is held in closed position by the higher pressure in the tube 50′ at the left-hand region of the fitting and in the fuel tank 46. In the operation of the engine, the pressure pulsations or periods of increased pressure developed in the engine crankcase establish fluid flow in a left-hand direction through the passage 290 until the pressure at the opposite side of the fitting, that is, the left-hand side as viewed in FIGURE 11, is of the same value as the maximum pressure developed in the engine crankcase.

It is preferable to form the check ball or check valve 294 of comparatively light weight material, such as nylon (polyamide resin) or other suitable material, in order to reduce the inertia factor of the valve to a minimum to assure rapid opening and closing of the valve at frequencies upwards of 10,000 movements per minute. Through the use of a comparatively light weight or low inertia valve member, the valve is readily responsive to high frequency pressure pulsations for effectively pressurizing the fuel tank 46.

FIGURES 13 and 14 illustrate another form of valve unit for use with the pressurizing line or tubular means 50″ arranged between the engine crankcase 12 and the fuel tank 46. In this form, a member or valve cage or valve housing 304 preferably formed of nonferrous metal is inserted in the pressurizing line 50″ formed of flexible or yieldable material. The valve cage 304 is of generally cylindrical shape and is provided with an interior bore 306 in which is disposed an annular or a ring-shaped valve set 308 fashioned of nonmetallic material, synthetic rubber or the like which cooperates with a check ball or valve 310 loosely contained in the bore 306. The ball is prevented from being dislodged by a retainer 298′ secured in an end of the cage 304 by swaging 300′.

The ball valve 310 is preferably made of light weight or low inertia material, such as nylon, so as to reduce the inertia factor and enhance rapid opening and closing of the valve under high frequency pressure pulsations.

The pressure pulsations from the engine crankcase project fluid through the passage 309 of the annular valve seat 308 past the valve 310, the fluid moving in a left-hand direction, as viewed in FIGURE 13, to establish increased pressure in the fuel tank 46. In this form, fluid or pneumatic pressure in the fuel tank is relied upon to seat the ball valve.

FIGURES 15 and 16 illustrate another form of valve unit for use in a fuel tank pressurizing tube or line 50a. In this form a valve cage or valve housing 314 of cylindrical shape is slightly larger diameter than the inner diameter of the tube 50a whereby the cage 314 may be frictionally held in a predetermined position within the tube. The fitting or valve cage may be made of brass or other suitable nonferrous material. The valve cage 314 is fashioned with a central bore 316 in which is disposed a ball check valve 318 and an expansive coil spring 320, the latter having one end seating against an annular ledge 322 defining a passage 324 in the adjacent end of the valve cage.

The valve cage or housing is formed with a counterbore accommodating an annular or ring-shaped valve seat 326 held in the counterbore by a retainer ring or member 328 secured by swaging an adjacent region 330 of the fitting 314 into engagement with the retainer 328. The ball valve 318 is preferably of light weight or low inertia material, such as nylon, and is normally biased toward closed position in engagement with the valve seat 326 under the influence of the spring 320.

The annular valve seat member 326 is fashioned of synthetic rubber or other suitable material for cooperation with the check ball or valve 318. In this form pressure pulsations developed in the crankcase cause movement of air or fluid in a left-hand direction, as viewed in FIGURE 15, through the passage 332 past the ball valve 318 and through passage 324 to the fuel tank 46 for pressurizing the tank.

FIGURES 17 and 18 illustrate another form of valve unit or check valve construction for use in pressurizing the fuel tank 46, shown in FIGURE 1. This form is similar to the form shown in FIGURE 15 and includes a valve cage or valve housing 314′ inserted in a tube 50b formed of flexible material, the cage being of larger diameter than the inner diameter of the tube or pressurizing line 50b whereby the valve cage is frictionally held in predetermined position within the tube 50b.

The cage 314′ is formed with a bore 316′ in which is disposed an expansive coil spring 320′, one end seating against a retainer 336 held in place by swaging 338. Disposed in the bore 316′ is a ball valve 318′ adapted to seat against a ledge 340 formed at the juncture of the bore 316′ with a passage 342 of lesser diameter than the bore 316′.

The operation of the valve unit is similar to that of the form shown in FIGURE 15. Pressure pulsations in the crankcase of the engine move air or fluid from the engine crankcase through the bore or passage 342 past a ball valve 318′ through the bore 316′ to the fuel tank 46, shown in FIGURE 1.

The ball valve 318′ is made of nylon or similar light weight material to facilitate rapid opening and closing of the valve under high frequency pressure pulsations. The valve 318′, in closed position, retains pressure in the fuel supply tank 46 to pressurize the fuel supply.

FIGURES 19, 20 and 21 illustrate another form of check valve unit for incorporation in a pressurizing tube or line for a fuel tank. Inserted in the flexible tube 50c is a cylindrically-shaped valve cage or valve housing 346 fashioned of brass or other suitable material of slightly larger diameter than the inner diameter of the pressurizing tube 50c whereby the valve cage is held in predetermined position in the tube 50c. The cage 346 is provided with a bore 348 and a passage 350 in one end region thereof of lesser diameter than that of the bore 348.

The inner end of the passage 350 is defined by a raised circular ridge 352, as shown in FIGURE 19. The circular ridge 352 provides a seat for a disc-type valve 354, shown in detail in FIGURE 21, the disc being preferably formed with radially extending projections or lugs 356 for centering the disc within the bore 348 so that the disc properly engages the circular valve seat or ridge 352.

An expansive coil spring 358, disposed in the bore 348, biases the disc valve 354 toward closed position in contact with the valve seat 352. The opposite end of the spring 358 seats against an annular retainer member 360 secured in position in the valve cage by a swaged portion 362.

The operation of the valve unit, shown in FIGURES 19 through 21, is substantially the same as the other valve units hereinbefore described. The pressure pulsations in the engine crankcase force air or fluid from the crankcase through the passage 350, past the valve 354 and through the bore 348 to the fuel supply tank 46 for pressurizing the fuel tank. The valve disc 354 is made comparatively thin to reduce the inertia factor thereof and facilitate rapid opening and closing of the valve.

FIGURE 22 is illustrative of a valve unit similar to that shown in FIGURE 19, the unit being directly connected with the crankcase of an engine. In this form, a valve cage or valve housing 364 is provided with a threaded tenon or projection 366 which is threaded into an opening provided in a wall of the engine crankcase, such as the crankcase 12 shown in FIGURE 1. The tenon portion 366 is fashioned with a bore or passage 368, the inner end of the tenon portion formed with a circular ridge 370 providing a seat for a disc-type valve 354' of the character shown in FIGURE 21 disposed in a bore 372 formed in the enlarged portion of the valve cage 364.

An expansive spring 358' biases the disc valve 354' toward closed position in engagement with the circular seat or ridge 370, the opposite end of the spring seating against an annular retainer 360' the latter being held in place by swaging the end region of the fitting 364 as indicated at 374.

Pressure pulsations within the crankcase force fluid through the passage 368 past the valve 354' through the bore 372 and the tube 50d to the fuel tank 46, shown in FIGURE 1, for pressurizing the fuel supply.

It is to be understood that the cage constructions of the valve units disclosed herein may be fashioned in the manner shown in FIGURE 22 wherein an integral threaded projection is formed on the valve cage and adapted to be threaded into an opening in the crankcase wall. However, with valve arrangements of the character shown in FIGURES 3 and 10 through 21, it is desirable that the units be contained within the flexible or yieldable pressurizing tube in order to reduce the effect of engine vibrations upon the check valves, particularly those of the character shown at 294 and 310 in FIGURES 11 and 13 respectively where no additional spring means or media other than fluid pressure in the tank is utilized for biasing the check valve toward closed position.

The pressurizing system for a fuel supply tank of the character described herein enables the establishment of effective pressure in the fuel tank to pressurize the fuel and thereby eliminate the use of an independent fuel pump. The pressurizing system enables the successful operation of the engine in all positions at high speeds under all load conditions regardless of whether the fuel tank is upright or inverted with the pressure line connection at the fuel tank submerged as the valve means in the pressurizing line prevents reverse flow of fluid or fuel from the fuel tank into the engine crankcase.

It is apparent that, within the scope of the invention, modifications and different arrangements may be made other than as herein disclosed, and the present disclosure is illustrative merely, the invention comprehending all variations thereof.

We claim:

1. A fuel feed system for an internal combustion engine, said system including an unvented fuel supply tank adapted to contain liquid fuel, a charge forming device connected with the engine having a mixing passage formed therein, a fuel inlet valve in the charge forming device, means biasing the inlet valve toward closed position, a diaphragm in the charge forming device actuated by aspiration in the mixing passage arranged to control the opening of the inlet valve, a fuel conveying tube connecting the charge forming device with the fuel supply tank for delivering fuel to a region adjacent the fuel inlet valve, fuel intake means disposed in the fuel supply tank for following movement of the fuel in the fuel supply tank and to carry fuel from the fuel supply tank to the fuel conveying tube irrespective of the attitude of the fuel supply tank, tubular means connecting the fuel supply tank with a source of varying fluid pressure established within the crankcase of the internal combustion engine for pressurizing the fuel supply tank, and check valve means associated with the tubular means for maintaining fluid pressure in said fuel supply tank during operation of the engine.

2. A fuel feed system for an internal combustion engine, said system including an unvented fuel supply tank adapted to contain liquid fuel, a charge forming device connected with the engine having a mixing passage formed therein, a fuel inlet valve in the charge forming device, spring means biasing the inlet valve toward closed position, a fuel chamber in the charge forming device, a diaphragm forming a wall of the fuel chamber in the charge forming device actuated by aspiration in the mixing passage arranged to control the opening of the inlet valve, a fuel conveying tube connecting the charge forming device with the fuel supply tank for delivering fuel to a region of the fuel inlet valve, fuel intake means disposed in the fuel supply tank for following movement of the fuel in the fuel supply tank and to carry fuel from the fuel supply tank to the fuel conveying tube irrespective of the attitude of the fuel supply tank, tubular means connecting the fuel supply tank with a source of varying fluid pressure established within the crankcase of the internal combustion engine during engine operation for pressurizing the fuel supply tank, a valve housing connected with the tubular means, a check valve in said housing for maintaining fluid pressure in said fuel supply tank during operation of the engine, and resilient means normally biasing the check valve toward closed position.

3. A fuel feed system for an internal combustion engine, said system including an unvented fuel supply tank adapted to contain liquid fuel, a charge forming device connected with the engine having a mixing passage formed therein, a fuel inlet valve in the charge forming device, means biasing the inlet valve toward closed position, a diaphragm in the charge forming device actuated by aspiration in the mixing passage arranged to control the opening of the inlet valve, a fuel conveying tube connecting the charge forming device with the fuel supply tank for delivering fuel to a region adjacent the fuel inlet valve, a flexible tubular member in said fuel tank in communication with the fuel conveying tube, the inlet end of the tubular member being weighted to maintain the inlet end of the tubular member immersed in the liquid fuel in the fuel supply tank, tubular means connecting the fuel supply tank with a source of varying fluid pressure established within the crankcase of the internal combustion engine, for pressurizing the fuel supply tank, and a check valve of comparatively light weight associated with the tubular means for maintaining fluid pressure in said fuel supply tank during operation of the engine.

4. A closed fuel feed system for an internal combustion engine, said system including an unvented fuel supply tank adapted to contain liquid fuel, a carburetor connected with the engine having a mixing passage formed therein, a fuel inlet valve in the charge forming device, means biasing the inlet valve toward closed position, a diaphragm in said carburetor actuated by reduced pressure in the mixing passage arranged to control the opening of the inlet valve, a fuel conveying tube connecting the charge forming device with the fuel supply tank for delivering fuel to a region adjacent the fuel inlet valve, fuel intake means disposed in the fuel supply tank for following movement of the fuel in the fuel supply tank and to carry fuel from the fuel supply tank to the fuel conveying tube irrespective of the attitude of the fuel supply tank, nonmetallic tubular means connecting the fuel supply tank with a source of varying fluid pressure established within the crankcase of the internal combustion engine for pressurizing the fuel supply tank, and a check valve means having low inertia disposed in the tubular means for maintaining fluid pressure in said fuel supply tank during operation of the engine.

5. An unvented fuel feed system for an internal combustion engine, said system including an unvented fuel supply tank adapted to contain liquid fuel, a carburetor connected with the engine having a mixing passage formed therein, a fuel inlet valve in the charge forming device, means biasing the inlet valve toward closed position, a diaphragm in said carburetor actuated by reduced pressure in the mixing passage arranged to control the opening of the inlet valve, a fuel conveying tube connecting the charge forming device with the fuel supply tank for delivering fuel to a region adjacent the fuel inlet valve, a flexible tubular member in said fuel tank in communication with the fuel conveying tube, the inlet end of the tubular member being weighted to maintain the inlet end of the tubular member immersed in the liquid fuel in the fuel supply tank, flexible non-metallic tubular means connecting the fuel supply tank with a source of varying fluid pressure developed within the crankcase of the internal combustion engine for pressurizing the fuel supply tank, a valve housing in the tubular means, and a check valve in said housing for maintaining fluid pressure in said fuel supply tank during operation of the engine.

6. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve toward closed position, a diaphragm in said carburetor actuated by aspiration in the mixing passage arranged to control the opening of the inlet valve to admit fuel into the carburetor for delivery into the mixing passage, a fuel conveying tube connecting the inlet region of the carburetor with the fuel supply tank, a flexible tubular member in said fuel tank in communication with the fuel conveying tube, the inlet end of the tubular member being weighted to maintain the inlet end of the tubular member immersed in the liquid fuel in the fuel supply tank, tubular means connecting the fuel supply tank with a source of varying fluid pressure established within the crankcase of the internal combustion engine for pressurizing the fuel supply tank, a valve housing connected with the tubular means, a valve seat in the housing, and a check valve of low inertia in said housing arranged for cooperation with the valve seat for admitting flow of fluid from the engine into the fuel supply tank and preventing flow of fluid in the opposite direction for maintaining fluid pressure in the fuel supply tank during operation of the engine.

7. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve to closed position, a diaphragm in said carburetor actuated by reduced pressure in the mixing passage arranged to control the opening of the inlet valve to admit fuel into the carburetor for delivery into the mixing passage, a fuel conveying tube connecting the inlet region of the carburetor with the fuel supply tank, a flexible tubular member in said fuel tank in communication with the fuel conveying tube, the inlet end of the tubular member being weighted to maintain the inlet end of the tubular member immersed in the liquid fuel in the fuel supply tank, tubular means connecting the fuel supply tank with a source of varying fluid pressure developed within the crankcase of the internal combustion engine for pressurizing the fuel supply tank, a valve housing connected with the tubular means, a valve seat in the housing, a check valve of low inertia in said housing arranged for cooperation with the valve seat for admitting flow of fluid from the engine into the fuel supply tank and preventing flow of fluid in the opposite direction for maintaining fluid pressure in the fuel supply tank during operation of the engine, and resilient means normally biasing the check valve toward its seat.

8. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve to closed position, a diaphragm in said carburetor actuated by reduced pressure in the mixing passage arranged to control the opening of the inlet valve to admit fuel into the carburetor for delivery into the mixing passage, a fuel conveying tube connecting the inlet region of the carburetor with the fuel supply tank, fuel intake means disposed in the fuel supply tank for following movement of the fuel in the fuel supply tank and to carry fuel from the fuel supply tank to the fuel conveying tube irrespective of the attitude of the fuel supply tank, a flexible tubular means connecting the fuel supply tank with the crankcase of the engine, a valve housing associated with the flexible tubular means having a valve seat therein, a ball valve of light weight material in said housing, and spring means biasing the ball valve in said housing toward the valve seat whereby pressure from the engine crankcase to the fuel supply tank pressurizes the fuel supply tank and impede flow of fluid in the opposite direction in said tubular means.

9. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve to closed position, a diaphragm in said carburetor actuated by reduced pressure in the mixing passage arranged to control the opening of the inlet valve to admit fuel into the carburetor for delivery into the mixing passage, a fuel conveying tube connecting the inlet region of the carburetor with the fuel supply tank, a flexible tube of nonmetallic material connecting the crankcase of the engine with the fuel supply tank, a flexible tubular member in said fuel tank in communication with the fuel conveying tube, the inlet end of the tubular member being weighted to maintain the inlet end of the tubular member immersed in the liquid fuel in the fuel supply tank, a valve casing in said flexible tube, a valve seat of nonmetallic material in said casing, and a check valve of resinous material in said casing, said valve being arranged whereby to admit flow of fluid from the engine crankcase into the fuel tank to pressurize the fuel supply tank and impede flow of fluid in the opposite direction.

10. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve to closed position, a diaphragm in said carburetor actuated by reduced pressure in the mixing passage arranged to control the opening of the inlet valve to admit fuel into the carburetor for delivery into the mixing passage, a fuel conveying tube connecting the inlet region of the carburetor with the fuel supply tank, a flexible tubular member in said fuel tank in communication with the fuel conveying tube, the inlet end of the tubular member being weighted to maintain the inlet end of the tubular member immersed in the liquid fuel in the fuel supply tank, a flexible tube of nonmetallic material connecting the crankcase of the engine with the fuel supply tank, a valve casing connected with the flexible tube, a disc-like member of flexible nonmetallic material in said casing, said member being shaped to provide a flap valve portion, a seat for said flap valve portion in said casing, resilient means in said casing biasing said flap valve toward closed position, said valve being arranged whereby to admit flow of fluid from the engine crankcase into the fuel tank to pressurize the fuel supply tank and obstruct flow of fluid in the opposite direction.

11. A fuel feed system for an internal combustion engine, said system including an unvented fuel supply tank adapted to contain liquid fuel, a carburetor connected with the engine having a mixing passage formed therein, a fuel inlet valve in the charge forming device, means biasing the inlet valve toward closed position, a diaphragm in said carburetor actuated by reduced pressure in the mixing passage arranged to control the opening of the inlet valve, a fuel conveying tube connecting the charge forming device with the fuel supply tank for delivering fuel to a region adjacent the fuel inlet valve, a flexible tubular member in said fuel tank in communication with the fuel conveying tube, the inlet end of the tubular member being weighted to maintain the inlet end of the tubular member immersed in the liquid fuel in the fuel supply tank, flexible nonmetallic tubular means connecting the fuel supply tank with a source of varying fluid pressure developed by the crankcase of the internal combustion engine for pressurizing the fuel supply tank, a fitting associated with the tubular means, and a flap valve of nonmetallic material in said fitting for maintaining fluid pressure in said fuel supply tank during operation of the engine.

12. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve to closed position, a diaphragm in said carburetor actuated by reduced pressure in the mixing passage arranged to control the opening of the inlet valve to admit fuel into the carburetor for delivery into the mixing passage, a fuel conveying tube connecting the inlet region of the carburetor with the fuel supply tank, a flexible tubular member in said fuel tank in communication with the fuel conveying tube, the inlet end of the tubular member being weighted to maintain the inlet end of the tubular member immersed in the liquid fuel in the fuel supply tank, a check valve unit including a valve housing, tubular means connecting the valve unit with the fuel supply tank and the engine crankcase, a disc-like member of flexible nonmetallic material in said housing, a passage in said housing, said disc-like member having a flap portion arranged to control flow of fluid from the engine crankcase through the passage for pressurizing the fuel supply tank, resilient means normally biasing the flap portion to a position closing said passage, said housing having a raised circular valve seat for said flap portion.

13. A fuel feed system for an internal combustion engine, said system including an unvented fuel supply tank adapted to contain liquid fuel, a carburetor having a mixing passage formed therein connected with the engine, a fuel inlet in the carburetor, a valve for said inlet, spring means biasing the inlet valve to closed position, a diaphragm in said carburetor actuated by reduced pressure in the mixing passage arranged to control the opening of the inlet valve to admit fuel into the carburetor for delivery into the mixing passage, a fuel conveying tube connecting the inlet region of the carburetor with the fuel supply tank, a flexible tubular member in said fuel tank in communication with the fuel conveying tube, the inlet end of the tubular member being weighted to maintain the inlet end of the tubular member immersed in the liquid fuel in the fuel supply tank, a valve unit including a valve housing, tubular means connecting the valve unit with the fuel supply tank and the engine crankcase, a disc valve in said housing, a passage in said housing, said disc valve being arranged to control flow of fluid from the engine crankcase through the passage for pressurizing the fuel supply tank, and resilient means normally biasing the disc valve to a position closing said passage.

14. A fuel feed system for an internal combustion engine, said system including an unvented fuel supply tank adapted to contain liquid fuel, a carburetor having a mixing passage formed therein connected with the engine, a fuel inlet valve seat member in the carburetor, an inlet valve member cooperating with the seat member, the cooperating portion of one of said members being formed of nonmetallic deformable material, spring means biasing the inlet valve member to closed position, a diaphragm in said carburetor actuated by aspiration in the mixing passage arranged to control the opening of the inlet valve to admit fuel into the carburetor for delivery into the mixing passage, a fuel conveying tube connecting the inlet of the carburetor with the supply tank, a flexible tubular member in said fuel tank in communication with the fuel conveying tube, the inlet end of the tubular member being weighted to maintain the inlet end of the tubular member immersed in the liquid fuel in the fuel supply tank, tubular means connecting the fuel supply tank with a source of varying fluid pressure developed within the crankcase of the internal combustion engine for pressurizing the fuel supply tank, a valve housing connected with the tubular means, a valve seat in the housing, and a check valve of low inertia in said housing arranged for cooperation with the valve seat for admitting flow of fluid from the source of varying pressure into the fuel supply tank and preventing flow of fluid in the opposite direction for maintaining fluid pressure in the fuel supply tank during operation of the engine.

References Cited by the Examiner

UNITED STATES PATENTS

| 1,907,725 | 5/1933 | Bracke. | |
|---|---|---|---|
| 2,264,365 | 12/1941 | Conover | 123—73 |
| 2,579,023 | 12/1951 | Thomas. | |
| 2,656,828 | 10/1953 | Conover. | |
| 2,722,208 | 11/1955 | Conroy. | |
| 2,794,431 | 6/1957 | Ginnow. | |
| 2,841,372 | 7/1958 | Phillips. | |

MARK NEWMAN, *Primary Examiner.*

FRED E. ENGELTHALER, *Examiner.*

W. E. BURNS, *Assistant Examiner.*